(12) United States Patent  
Lafontaine

(10) Patent No.: US 7,963,384 B2
(45) Date of Patent: Jun. 21, 2011

(54) AUTOMATED ORDER SEQUENCING METHOD AND SYSTEM

(75) Inventor: Daniel R. Lafontaine, Vaudreuil-Dorion (CA)

(73) Assignee: 3584925 Canada Inc., Vaudreuil-Dorion, Québec (CA)

( * ) Notice: Subject to any disclaimer, the term of this patent is extended or adjusted under 35 U.S.C. 154(b) by 388 days.

(21) Appl. No.: 12/314,943

(22) Filed: Dec. 19, 2008

(65) Prior Publication Data

US 2010/0158647 A1 Jun. 24, 2010

(51) Int. Cl.
*B65G 1/137* (2006.01)
(52) U.S. Cl. ............... 198/349; 198/347.4; 198/437; 198/448; 198/529; 198/575; 414/268; 414/270; 414/798.2; 414/922
(58) Field of Classification Search ............... 198/347.1, 198/347.4, 349, 359, 436, 437, 444, 448, 198/465.1, 528, 529, 575, 576; 414/791.6, 414/798.2, 798.4, 788, 799, 900, 902, 922, 414/923, 268, 170, 276, 281; 193/35 R, 193/35 A, 37
See application file for complete search history.

(56) References Cited

U.S. PATENT DOCUMENTS

| | | | |
|---|---|---|---|
| 2,808,946 A | 10/1957 | Just et al. | |
| 4,621,745 A * | 11/1986 | Grace | 221/75 |
| 4,787,803 A * | 11/1988 | van Elten et al. | 414/281 |
| 4,835,702 A | 5/1989 | Tanaka | |
| 5,018,073 A | 5/1991 | Goldberg | |
| 5,230,206 A | 7/1993 | Christ | |
| 5,271,703 A | 12/1993 | Lindqvist et al. | |
| 5,361,889 A | 11/1994 | Howell et al. | |
| 5,454,688 A | 10/1995 | Pippin | |
| 5,472,309 A * | 12/1995 | Bernard et al. | 414/807 |
| 5,669,748 A * | 9/1997 | Knudsen, Jr. | 414/273 |
| 5,716,189 A * | 2/1998 | Winski et al. | 414/800 |
| 5,730,579 A * | 3/1998 | Keck et al. | 414/791.6 |
| 5,803,703 A * | 9/1998 | Winski | 414/791.6 |
| 5,934,864 A | 8/1999 | Lyon et al. | |
| 5,996,316 A * | 12/1999 | Kirschner | 53/443 |
| 6,186,724 B1 | 2/2001 | Hollander | |
| 6,290,448 B1 * | 9/2001 | Focke et al. | 414/222.01 |
| 6,321,138 B1 * | 11/2001 | Livesay et al. | 700/245 |
| 6,425,226 B1 | 7/2002 | Kirschner | |
| 6,450,751 B1 | 9/2002 | Hollander | |
| 6,626,632 B2 * | 9/2003 | Guenzi et al. | 414/789.6 |
| 6,640,953 B2 | 11/2003 | Brouwer et al. | |
| 6,871,116 B2 * | 3/2005 | Brust et al. | 700/245 |
| 6,881,916 B2 * | 4/2005 | McLaughlin et al. | 209/584 |
| 7,066,315 B2 * | 6/2006 | Tanaka | 198/349 |
| 7,128,197 B2 * | 10/2006 | Haan et al. | 198/347.4 |
| 7,156,220 B2 * | 1/2007 | Olson et al. | 198/465.1 |
| 7,184,855 B2 | 2/2007 | Stingel et al. | |
| 7,200,465 B2 * | 4/2007 | Stingel et al. | 700/217 |
| 7,261,509 B2 * | 8/2007 | Freudelsperger | 414/269 |
| 7,331,440 B2 | 2/2008 | Lafontaine et al. | |
| 7,380,651 B2 | 6/2008 | Lafontaine et al. | |
| 7,735,624 B2 * | 6/2010 | Koide et al. | 198/358 |
| 7,877,164 B2 * | 1/2011 | Grunbach et al. | 700/217 |
| 2003/0138312 A1 | 7/2003 | Watson et al. | |
| 2003/0176944 A1 | 9/2003 | Stingel, III et al. | |

* cited by examiner

*Primary Examiner* — Douglas A Hess
(74) *Attorney, Agent, or Firm* — Equinox Protection; Franz Bonsang, Patent Agent

(57) ABSTRACT

An automated case order preparation system including a crane for transporting groups of depalletized product cases to temporary storage on shelving, and to a plurality of gravity-powered case guides, for accumulating and dispensing cases to fulfill client order pallets.

22 Claims, 11 Drawing Sheets

AUTOMATED ORDER SEQUENCING METHOD AND SYSTEM

CROSS REFERENCE TO RELATED APPLICATIONS

Benefit of U.S. Provisional Application for Patent Ser. No. 61/006,009, filed on Dec. 14, 2007, is hereby claimed.

FIELD OF THE INVENTION

The present invention relates to order sequencing methods and systems, and more particularly to an automated case order sequencing method and system.

BACKGROUND OF THE INVENTION

The invention relates to an improved system and method for automatically preparing client orders in a distribution facility, where the inputs to the system are complete pallets of cases of individual products and the outputs of the system are client order pallets of mixed products.

The standard and most common method of preparing orders of products is manual picking of orders by workers, where the source pallets are located in static racking and employees follow a circuit through the racking and individually pick products from the source pallet and transfer them onto a client pallet. There are a number of variations on this basic method.

There are several disadvantages to manual picking which have driven the development of automated systems, such as:
  Low productivity;
  Difficulty in finding or retaining labor in some markets;
  Workplace injuries resulting from the inherently non-ergonomic task of manual picking;
  High cost of manual picking errors;
  Breakage and shrinkage;
  Poor use of physical space.

There are on the other hand several key advantages to manual order picking that have to be weighted when considering automation, such as:
  Low capital cost (forklifts and racking);
  High Reliability;
  Easily scalable;
  Product flexibility.

Despite considerable intellectual property in the field and a healthy number of competitors, there is small market penetration for automated case order preparation. The key factors weighed when considering such systems are:
  High cost;
  Poor reliability due to high complexity;
  Poor space utilization.

Accordingly, there is a need for an improved automated case order sequencing method and system that can meet the cost, reliability and space utilization requirements of the market.

SUMMARY OF THE INVENTION

It is therefore a general object of the present invention to provide an improved automated case order sequencing method and system.

The present automated case order sequencing method and system is typically used in a distribution center to prepare a selection of cases/boxes of different products corresponding to customer order.

Customer orders are usually composed of pallet quantities of a selection of cases. The sequences of cases produced according to this invention would be palletized onto pallets, loaded onto delivery trucks, and delivered to a customer.

The process inputs are pallets of cases as they are received from the manufacturing plant and the process outputs are sequences of cases, corresponding to the requirements of a customer's order.

The preferred method for automated case sequencing, especially for higher moving products is the case buffering and dispensing method, which generally consists of a number of case guides, replenished typically in layer quantities, and featuring a removal apparatus which is connected to a sequencing conveyor. The actuation of the removal apparatus in a predetermined order releases cases on the sequencing conveyor in the desired sequence to fulfill client orders.

Slower moving products use case AS/RS (Automated Storage and Retrieval System) as the preferred method, because this method has a very low fixed cost per product. The weakness of this technology is rate; therefore effort in the industry has been made to develop special configurations of these systems to improve their rates. However these technologies are still limited to slower moving products.

The buffering and dispensing method has a very high cost per product, but can handle high throughputs, i.e. it is very good at automating high moving products. A number of efforts have been made to lower the cost of these technologies and improve their space efficiency while still allowing maintenance access to their many moving parts.

If the buffering and dispensing technology could be made less expensive and with lower space requirements, it could be economical to fully automate more than just the higher moving products.

The goal of the invention is therefore to provide an improved system and method of buffering and dispensing in order to achieve lower cost per product and higher space efficiency, maintaining the high rates expected of this type of technology, and therefore enabling the cost-effective inclusion of slower moving products in the order automation system.

As advantages, the present invention addresses the shortcomings of existing order sequencing systems and methods in the following ways.

The use of a transporting device (from here on in a crane will be used to illustrate) instead of conveyors to move cases between the input to the system and the case guides has the following advantages.

A crane has small incremental cost per SKU (Stock Keeping Unit), where conveyors have a cost that is proportional to the number of SKUs to be automated
  Greatly reduced number of moving parts subject to wear and maintenance;
  Much easier access given that the crane can be worked on at ground level and moving the crane out of its aisle allows access to case guides;
  Greatly reduced noise.

These advantages can only be benefited from if the crane is made highly efficient, which is carried out in the present invention as follows:
  To maximize crane utilization, an algorithm is used to determine the orientation and maximum quantity of cases of a given product that will fit on the crane attachment, based on the product dimensions.
  To load and unload the crane quickly thereby reducing the cycle time.
    In one embodiment, multiple short groupings of the same products are loaded in parallel on the crane and multiple short parallel groupings of products are loaded on the case guides. This also minimizes the width of the crane aisle.

In a second embodiment, a single long grouping of cases is loaded onto the crane in a single step, and a single long grouping of cases is loaded onto the case guide in a single step by lining up and laterally transferring all of the cases simultaneously. This is achieved by angled and offset case guides along the sequencing conveyor (FIG. 9).

The invention achieves high space efficiency.

In a first embodiment featuring a number of short parallel case guides, the short case guides and the absence of fixed replenishment conveyors (because a crane is used to replenish) mean that sufficient maintenance access can be achieved by front or rear access, allowing for tight vertical pitch.

In a second embodiment featuring a number of long nested angled case guides, maintenance access is provided from the side of the case guides, therefore no access space needs to be allocated. The crane aisles are also very narrow.

In a first embodiment, a further advantage can be realized because it is possible in this embodiment to incline the case guides in order to benefit from the cost, maintenance and noise reductions that gravity powered case guides bring. It is also possible to provide different angles for different case guides because the guides are short and replenished by a crane.

In a second embodiment, the guides are inclined by design, which is conducive to being powered by gravity.

A further advantage of the invention is realized when gravity-powered case guides are used without speed controllers while using inclinations steep enough to ensure reliable product movement. This is achieved in the first embodiment by controlling the loading of the crane guides using a mechanism included on the crane attachment to control the descent of the cases in the guides and releasing them in close proximity to the queued cases already in the guide. This is achieved in the second embodiment by not only having a tilting feature to the crane attachment but also by using the horizontal and vertical positioning of the crane and knowledge of the case level in the guide in order to load the cases onto the guide in close proximity to the cases already on the guide.

A further advantage of this invention deals with the process that is required to support a case buffering and dispensing system. For the majority of products, it is not cost effective to load pallet quantities of cases into case guides. In fact, for the majority of products, it is only cost effective to store a quantity of one to two layers in the case guides and an external system must therefore be provided to handle the remaining partial pallets. This external system is part of the overall cost of an automated case order preparation system. The function of the partial pallet handling system is to deliver depalletized cases typically in layer quantities. Therefore, in the art, a case buffering and dispensing system is complemented by a separate partial pallet handling system. This combination reduces overall system costs.

Current methods used for partial pallet handling each have their advantages and disadvantages with regards to cost per SKU, rate efficiency, space utilization, product type flexibility and maintenance access. The approach of this invention is to integrate the partial pallet handling system into the case sequencing system. A raw production pallet is completely depalletized and transformed into handling units which are then transported by a crane and placed on shelving preferably in close proximity to the corresponding guide for that product. This method of partial pallet handling is superior to current methods in all significant aspects, resulting in the greatest overall system cost, space utilization and performance.

In addition, this approach also provides the following benefits:
  The handling unit size can be more optimized and flexible since the entire pallet quantity is transformed at one time;
  Although the cranes must now perform an additional function, the additional cranes required will be less costly and more efficient;
  This also results in a system that comprises fewer distinct subsystems, therefore spare or redundant component or subsystem costs are reduced;
  Another benefit of this approach is that it allows the case guides to be placed in close proximity to the ground, while the partial pallet shelving can be installed in the vertical space above the guides. This results in an overall system that is more space efficient while facilitating access to mechanical components.

In accordance with an aspect of the present invention, there is provided an automated case order preparation system for cases, including means for providing the system with at least partial production pallets of cases of products, means for depalletizing cases from said pallets, means for palletizing a stream of sequenced said cases from an output sequencing conveyor to form a client pallet, and computerized means to control the operation of said system, the system comprising:
  means for forming handling units from depalletized said cases, said handling units comprising at least one linear grouping of said cases of one said products wherein a length of each linear grouping includes between two and a predetermined amount of individual said cases depending on the length and width of each said case of a corresponding said products;
  a crane transporting at least one handling unit from a handling-unit forming area to at least one receiving case guide;
  a crane attachment mounting on said crane to load and unload handling units from said forming means and to said case guide;
  at least one removal apparatus, each said removal apparatus connecting to one said case guide being designated to contain said cases of said corresponding said products;
  the sequencing conveyor at least temporarily connecting to a downstream end of each said removal apparatus, wherein an output of said conveyor being the stream of said cases in a predetermined sequence.

Conveniently, the cases within each said linear grouping touch one another.

In one embodiment, the crane attachment transfers one said handling unit comprised of a plurality of said linear groupings, each said linear grouping being separated from one another by a space sufficient to ensure independent movement of each said linear grouping, from a direction parallel and in line with an upstream end of the case guides, into a plurality of parallel and adjacent said case guides.

Conveniently, the case guides are inclined with said guide downstream end connected to the removal apparatus being lower than said guide upstream end and with an inclination angle allowing said cases located thereon to be transported and accumulated by gravity.

In one embodiment, shelving is provided for temporary storage of at least one said handling unit, said shelving being located on at least one side of an aisle of said crane.

Accordingly, the crane and the crane attachment transport at least one said handling unit from the handling unit forming area to the shelving, and at least one said handling unit from said shelving to at least one said case guide.

Conveniently, a plurality of both said case guides and said shelving are distributed along the length of said crane aisle. Preferably, the plurality of case guides is continuously distributed along the length of said case aisle.

In one embodiment, the crane attachment discretely deposits one said handling unit comprised of at least one said linear grouping arranged in a single file, from a direction perpendicular to the length dimension of the case guide and wherein the crane attachment is parallel to the case guide in such a manner that all said cases within said one said handling unit are simultaneously transferred onto the case guide.

Conveniently, the case guides are inclined with said guide downstream end connected to the removal apparatus being lower than an upstream end of said guide and with an inclination angle allowing said cases located thereon to be transported and accumulated by gravity, the crane attachment tilting to match said inclination angle of the case guides.

Conveniently, the case guides are free of speed controlling devices and wherein the crane, in conjunction with the crane attachment, release the handling unit on one said case guide in contact relationship with the cases already queued thereon.

In accordance with a third aspect of the present invention, there is provided an automated case order preparation method for cases, including the steps of providing at least partial production pallets of cases of products, depalletizing cases from said pallets, palletizing a stream of sequenced cases from an output sequencing conveyor to form a client pallet and directing the operation with a computerized control system, the method further comprising the following steps of:
  a) forming handling units from the depalletized cases, said handling units comprising at least one linear grouping of one of said products wherein a length of each said linear grouping includes between two and a predetermined amount of individual said cases depending on the length and width of each said case of said one of said products;
  b) loading at least one of said handling units onto an attachment mounted on a crane, transporting said at least one handling unit, using said crane, to at least one of a plurality of receiving case guides and unloading said at least one handling unit from said crane-mounted attachment onto at least one of said case guides;
  c) forming a stream of a predetermined sequence of cases on one said output sequencing conveyor wherein said conveyor is at least temporarily connected to at least one removal apparatus at least temporarily connected to one said case guide, wherein said one said case guide is designated to contain cases of one of said products and wherein said control system directs the operation of the removal apparatus.

Conveniently, the crane attachment transfers one said handling unit comprised of a plurality of said linear groupings, each said linear grouping separated from another by space sufficient to ensure, in step b) of the method, independent movement of each said grouping, from a direction parallel and in line with an upstream end of the case guides, into a plurality of parallel and adjacent said case guides.

In one embodiment, the case guides are inclined with a downstream end of the case guide connected to the removal apparatus is lower than an upstream end of the case guide and with an inclination angle allowing said cases located thereon to be transported and accumulated by gravity in step b) of the method.

In one embodiment, shelving is provided for temporary storage of at least one said handling unit one behind another, said shelving being located on at least one side of an aisle of said crane, step b) of the method including loading, transporting, and unloading said handling units, using the crane and the crane attachment, from the handling unit forming area to the shelving, and from the shelving to at least one said case guide.

In one embodiment, the crane attachment is parallel to the case guide in such a manner that step b) of the method includes discretely depositing one said handling unit comprised of at least one said linear grouping arranged in a single file from a direction perpendicular to the length dimension of the case guide and simultaneously transferring all said cases within the handling unit onto the case guide.

Conveniently, the case guides are inclined with a guide downstream end of said case guide connected to the removal apparatus being lower than an upstream end of said guide and with an inclination angle allowing said cases located thereon to be transported and accumulated by gravity, the crane attachment tilting to match said inclination angle of the case guides, and wherein step b) of the method includes releasing the handling unit on said case guide in contact relationship with the cases already queued thereon using the crane in conjunction with the crane attachment.

In one embodiment, step b) of the method includes releasing the handling unit on said case guide in contact relationship with the cases already queued thereon using the crane in conjunction with the crane attachment.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

With reference to the annexed drawings, the preferred embodiments will be herein described for indicative purpose and by no means as a limitation.

Generally, the present invention provides a method and a system for automated case order handling that accepts an incoming stream of product cases 1 coming from a conventional product pallet depalletizing system and produces a stream of sequenced product cases 1 which correspond to the requirements of an order comprising cases 1 of different products.

Three preferred embodiments are described herein.

FIGS. 1 to 4 describe a first embodiment of the system.

Figure 1:
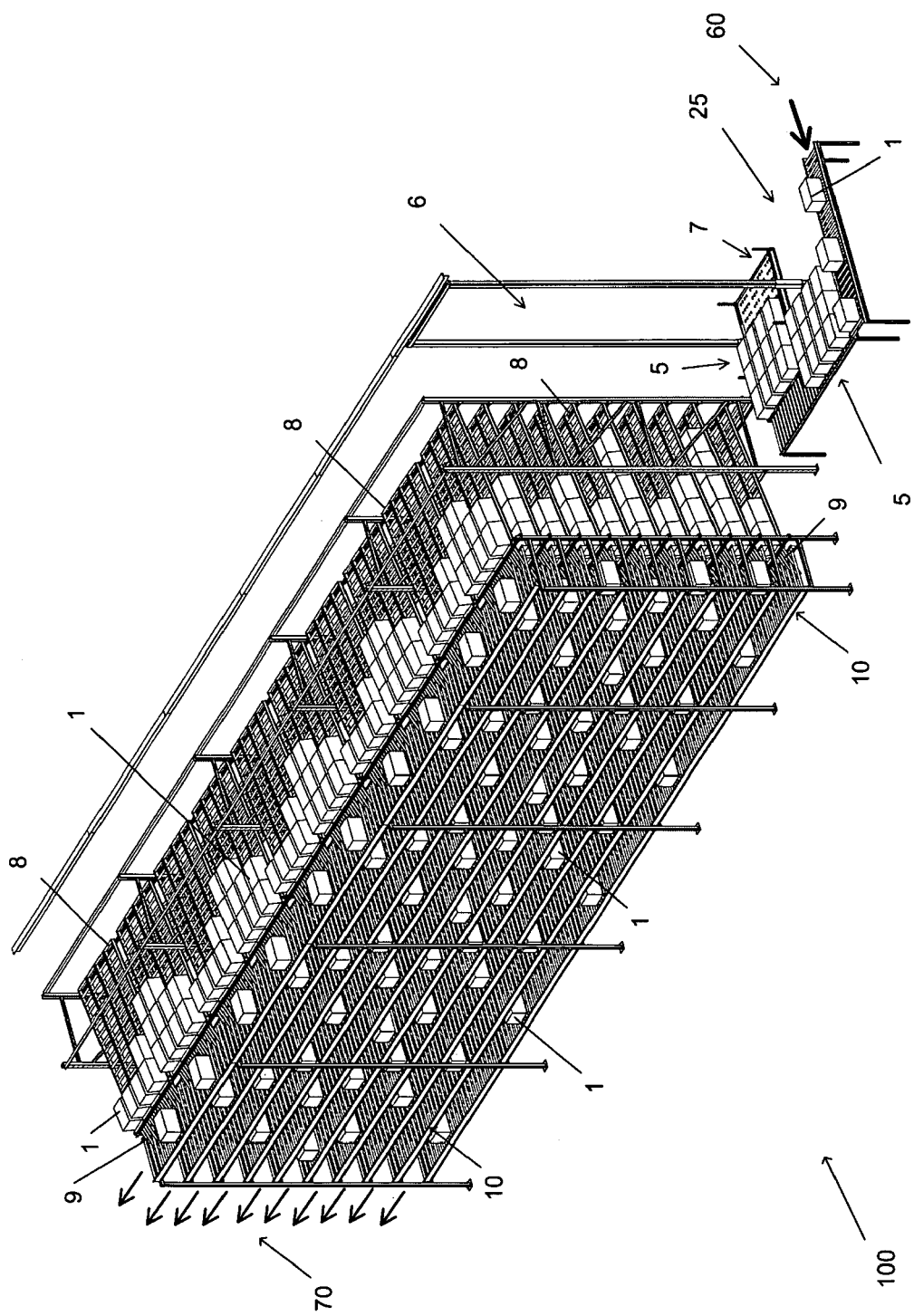
FIG. 1 is an overall perspective view of an automated case order preparation system for cases in accordance with a first embodiment of the present invention from the input of depalletized cases to the output of sequenced cases, showing the formation of a handling unit, the crane being loaded, the array of case guides and removal apparatuses, and the sequencing conveyors.

FIG. 1 is an overall perspective view of the first embodiment 100 of the system from the input 60 of depalletized cases 1 to the output 70 of sequenced cases 1. This shows the formation of a handling unit 5, the crane 6 being loaded, the array of case guides 8 and removal apparatuses 9, and the sequencing conveyors 10.

Figure 2:
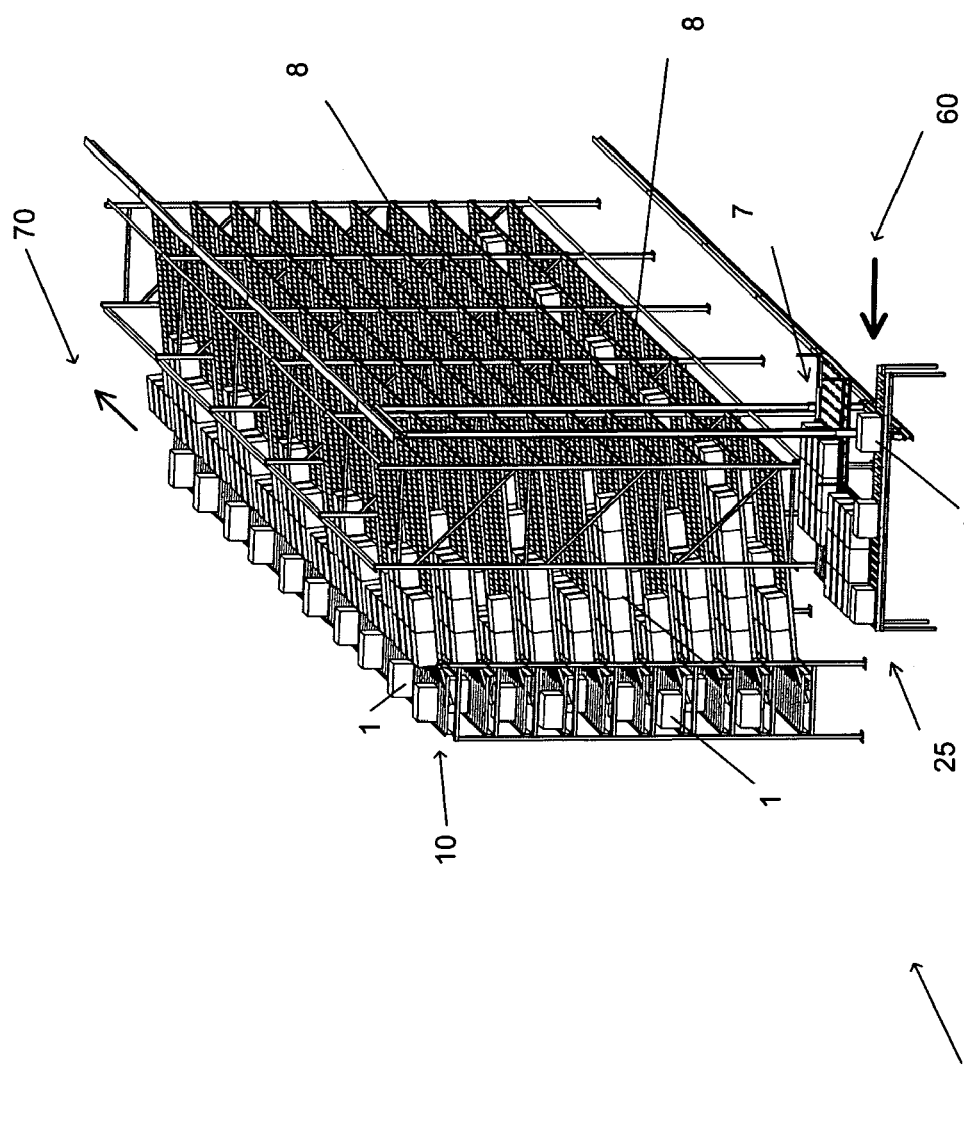
FIG. 2 is an overall perspective view of the first embodiment of the system showing the input side of the array of case guides.

In FIG. 2, the system embodiment 100 is shown from the input side of the array of case guides 8.

Cases 1 of one product type are delivered by a conventional warehouse storage, pallet handling, case depalletizing and case conveyor system (not shown) to the input conveyor 60 of the handling unit formation area 25.

The cases 1 of one product type are then grouped into linear groupings 4 of three cases; four linear groupings 4 of one product type are then assembled into a handling unit 5.

One skilled in the art will recognize that the quantities of cases per linear grouping and the quantity of cases per handling unit can change without deviating from the scope of the present invention.

The handling unit is transferred onto a crane 6 which is equipped with an attachment 7 that can load handling units unto itself.

The crane 6 then transports the handling unit 5 to a structure containing an array of case guides 8.

The crane attachment 7 loads the entire handling unit 5 into a group of case guides 8 that needs replenishment. In the embodiment shown here, there are four case guides 8 corresponding to the four linear groupings 4 of the handling unit 5.

The crane 6 then returns to pickup a handling unit 5 of the same or a different product, and then transports the handling unit 5 to be loaded into the next group of case guides 8 that need replenishment.

A computer system (not shown) commands the release of cases 1 of different products from the case guides 8, as required to comprise an order.

Downstream of each case guide 8, a case removal apparatus 9 controlled by the computer system selectively transfers the cases 1 from the case guides 8 onto a sequencing conveyor 10.

Several sequencing conveyors 10 are selectively merged together as directed by the computer system, to create a sequence of cases of different products comprising an order. Techniques for merging of streams of product on conveyors (not shown) are known in the art and are not a subject of the present invention. The completed sequence comprising an order is then palletized by a mixed case palletizer (not shown). Mixed case palletizing is also known in the art and is not a subject of the present invention.

It should be noted that in FIGS. 1 and 2 the sequencing conveyors 10 are shown with a series of cases 1 appearing at equal intervals along the length of the sequencing conveyor 10, while in reality there is more likely to be an uneven distribution of cases 1 corresponding to the sequence of product cases comprising an order. One skilled in the art will recognize that the quantity of cases per linear grouping 4, the quantity of cases per handling unit 5 and the quantity of cases per case guide 8 or the quantity of case guides 8 per grouping of case guides 8 may be configured according to the dimensions of the case 1 of product type, to optimize the performance of the system, without deviating from the scope of the present invention.

Figure 3:
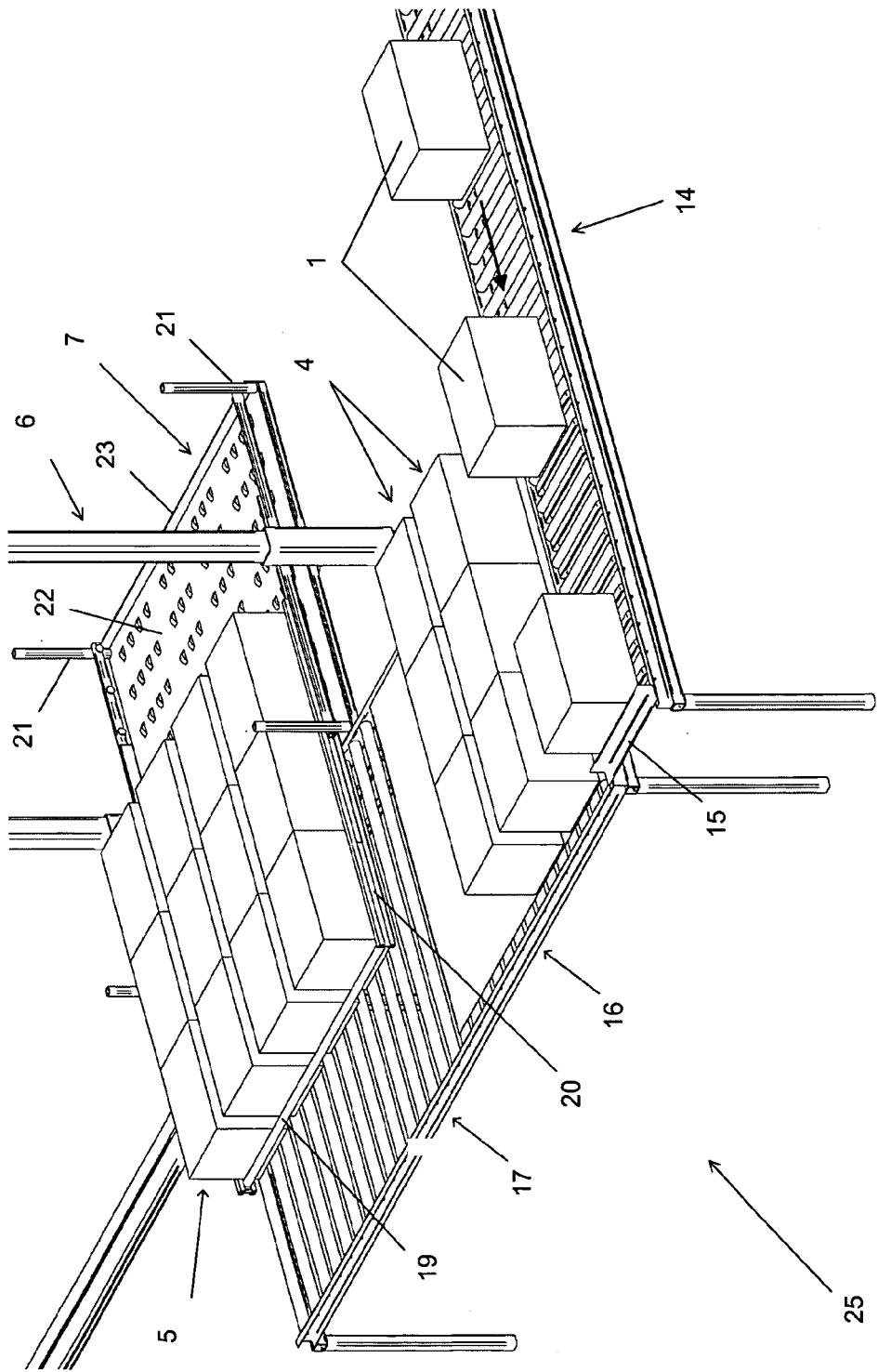
FIG. 3 is an enlarged perspective view of the crane attachment of the first embodiment of the system, illustrating the formation of linear groupings, how these are combined to form a handling unit and the loading of a handling unit onto the crane attachment.

FIG. 3 illustrates the formation of linear groupings 4 of cases, how they are combined to form a handling unit 5 and the loading of a handling unit 5 onto the crane attachment 7.

In the handling unit formation area 25, the cases 1 of one product type are grouped into linear groupings 4 of three cases 1 on a conventional accumulating roller conveyor 14, by accumulating the cases 1 against a fixed case stop 15. Each linear grouping 4 is transferred onto a wide belt conveyor 16 where spaces between each linear grouping 4 can be controlled. Four (4) linear groupings 4 of one product type are then assembled into a handling unit 5. The handling unit 5 is transferred onto a roller conveyor 17.

The crane attachment 7 has a case pusher/puller bar 19, which is connected to two horizontal telescoping actuators 20, which are in turn connected to two vertical telescoping actuators 21. Thus, the case pusher/puller bar can be raised above the cases 1 of the handling unit 5 resting on the roller conveyor 17, moved horizontally, then brought down behind the cases 1.

The crane attachment 7 comprises a skate wheel conveyor 22 onto which the handling unit 5 is pulled by the pusher/puller bar. Raisable case stops 23 at either end of the skate wheel conveyor can be raised as required to keep the handling unit 5 in position, and are selectively lowered as required to allow the handling unit 5 to transfer on or off the crane attachment 7.

Figure 4:
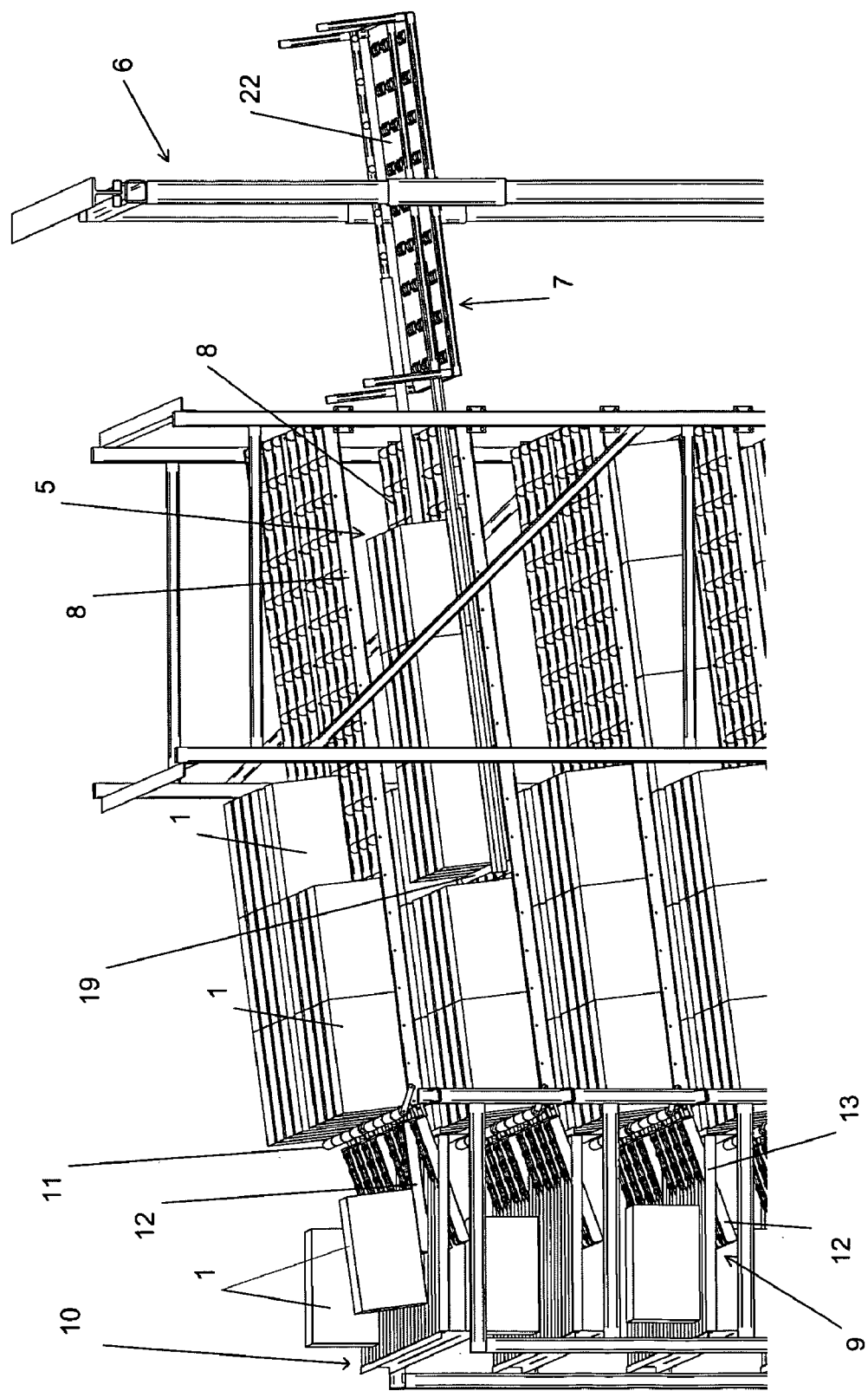
FIG. 4 is an enlarged perspective view of the crane attachment of the first embodiment of the system loading a handling unit into the case guides, also showing the case removal apparatuses and sequencing conveyor in relation to the case guides.

In FIG. 4, the crane attachment 7 of the system embodiment 100 is shown in the process of loading a handling unit 5 into the case guides 8.

The crane attachment 7 comprising a skate wheel conveyor 22 is able to tilt to an angle, as shown in FIG. 4, so as to match the angle of the case guides 8.

The case guides are comprised of gravity roller conveyors. When the crane attachment 7 has been positioned in front of the group of case guides 8 that need to be replenished, the downstream raisable case stop 23 (not shown) is lowered, and all of the cases 1 of the handling unit 5 are transferred by gravity into the case guides 8. During this transfer, if the products are fragile, and as shown in FIG. 4, the pusher/puller bar 19 may be used as a speed controller, providing a controlled release by holding back the cases 1 until they have reached their destination, close to the back of the cases 1 that are previously queued on the case guides. Once the cases have reached their destination the pusher/puller bar 19 is raised above the cases 1 and retracted towards the crane attachment 7.

The case removal apparatus 9 is comprised of a lowerable case stop 11, and a case transfer mechanism comprised of narrow transfer guides 12 that fit between the rollers 13 of the sequencing conveyor 10. As the case stop 11 at the downstream end of a case guide 8 is lowered, the case removal apparatus transfer guides 12 rise above the rollers 13 of the sequencing conveyor 10 to allow the case 1 to position itself above the sequencing conveyor 10 and then lower to allow the case 1 to deposit and exit on the sequencing conveyor 10.

FIGS. 5 to 8 describe a second embodiment of the system.

Figure 5:
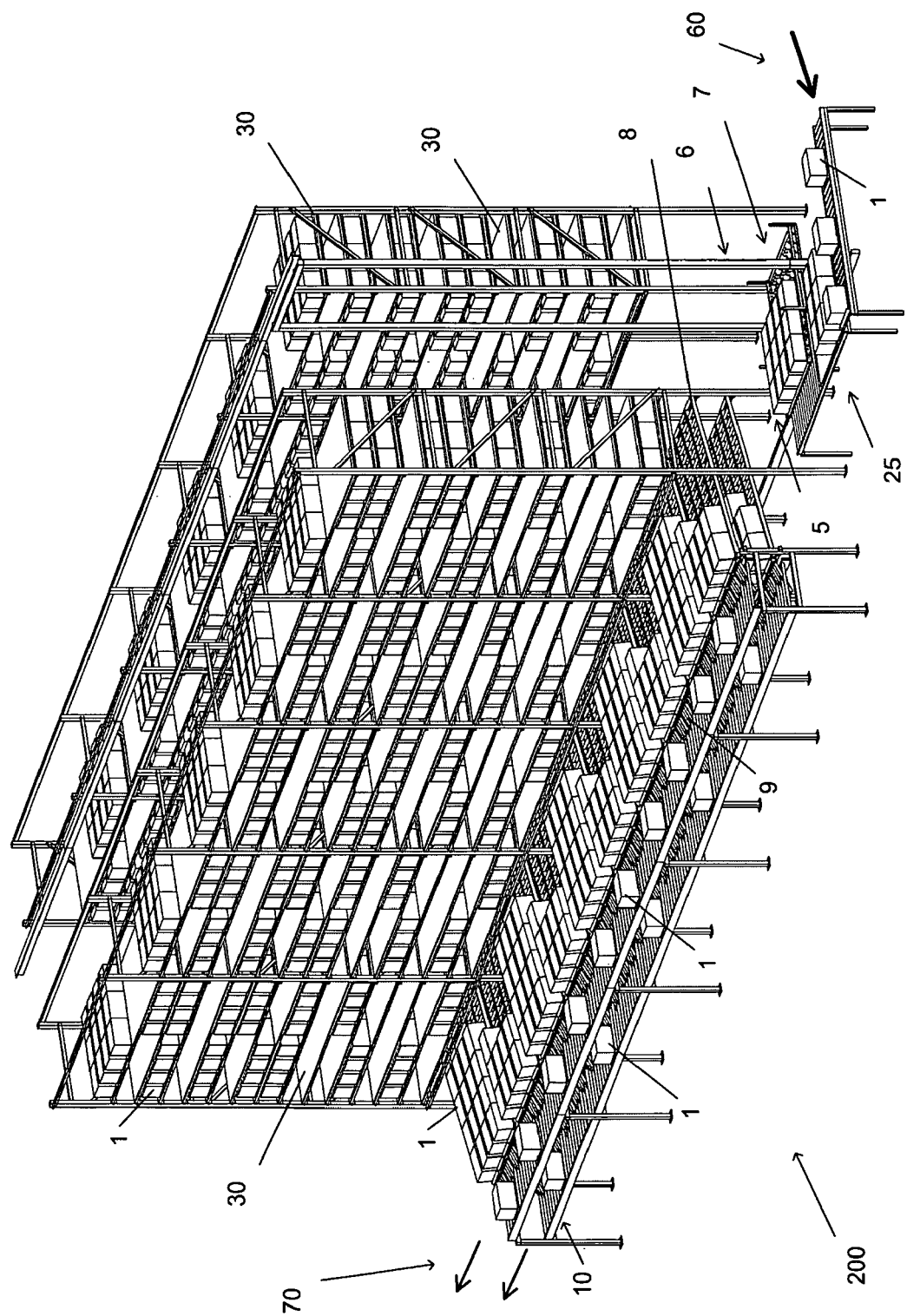
FIG. 5 is an overall perspective view of an automated case order preparation system for cases in accordance with a second embodiment the present invention from the input of depalletized cases to the output of sequenced cases, showing the formation of a handling unit, the crane being loaded, the array of case guides and removal apparatuses, and the sequencing conveyors.

More specifically, in FIG. 5, the system embodiment 200 from the input 60 of depalletized cases 1 to the output 70 of sequenced cases 1 is shown with the formation of a handling unit 5, the crane 6 being loaded, the array of case guides 8 and removal apparatuses 9, the array of storage shelves 30 and the sequencing conveyors 10.

Figure 6:
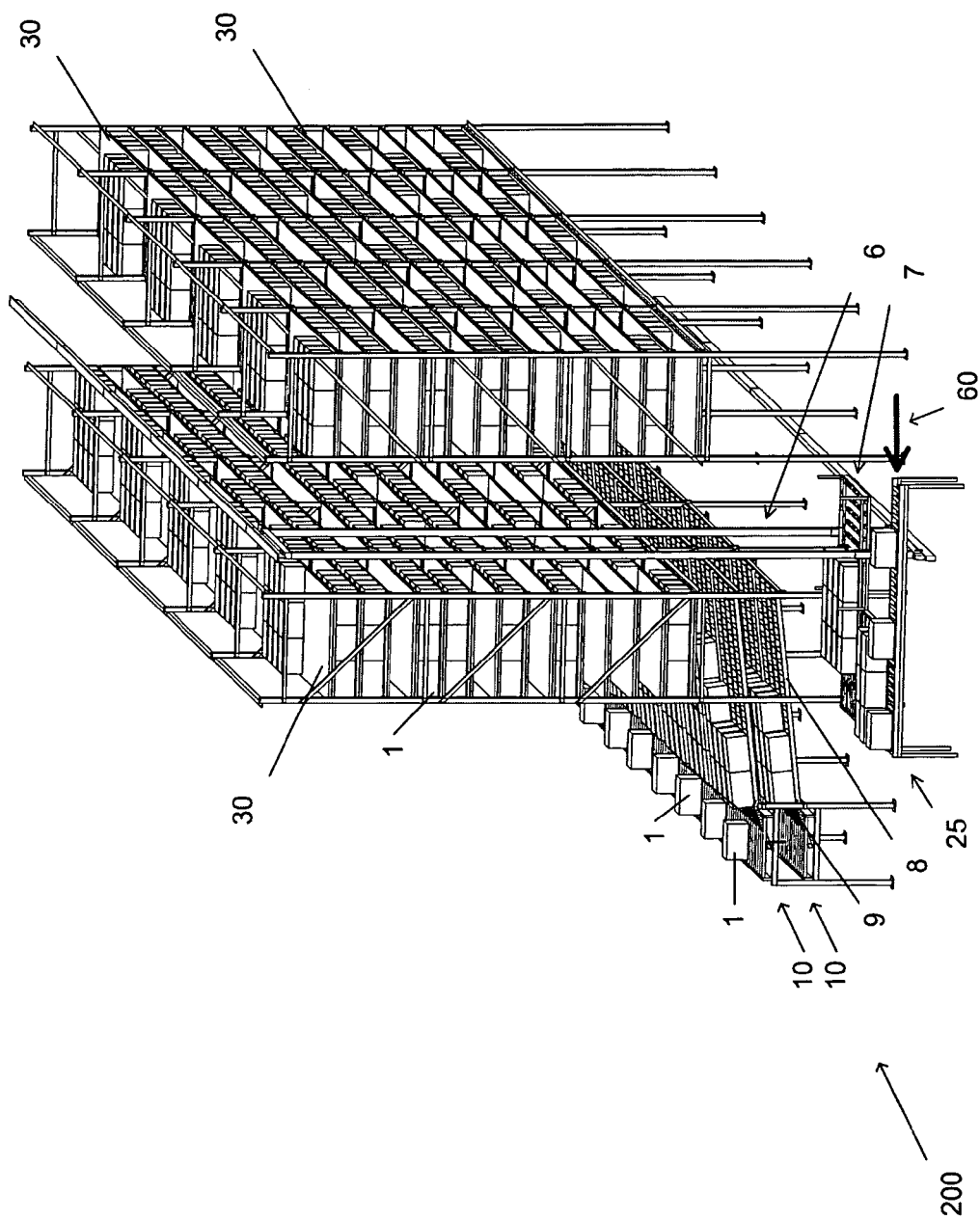
FIG. 6 is an overall perspective view of the second embodiment of the system showing the input side of the array of case guides, and the handling unit storage shelves.

In FIG. 6, of the system embodiment 200 is shown with the input side of the array of case guides 8, and the handling unit storage shelves 30.

In this system embodiment 200 storage shelves 30 are integrated to the system. The storage shelves 30 are located in a vertical arrangement above the case guides 8. Each storage shelf 30 can accommodate a complete handling unit 5. In this second embodiment of the system 200, the storage shelves 30 are sufficient in number so that they can accommodate up to two product pallet quantities of storage space for each product type.

The crane 6 of this system embodiment 200 performs the following cycle of tasks: first it picks up a handling unit 5 at the handling unit formation area 25, transports the handling unit 5 and loads it onto a storage shelf 30. It then goes to another product storage shelf 30 and picks up a handling unit 5, which it transports to a group of case guides 8 in need of replenishment, then returns to the handling unit formation area 25 to begin the cycle anew.

Figure 7:
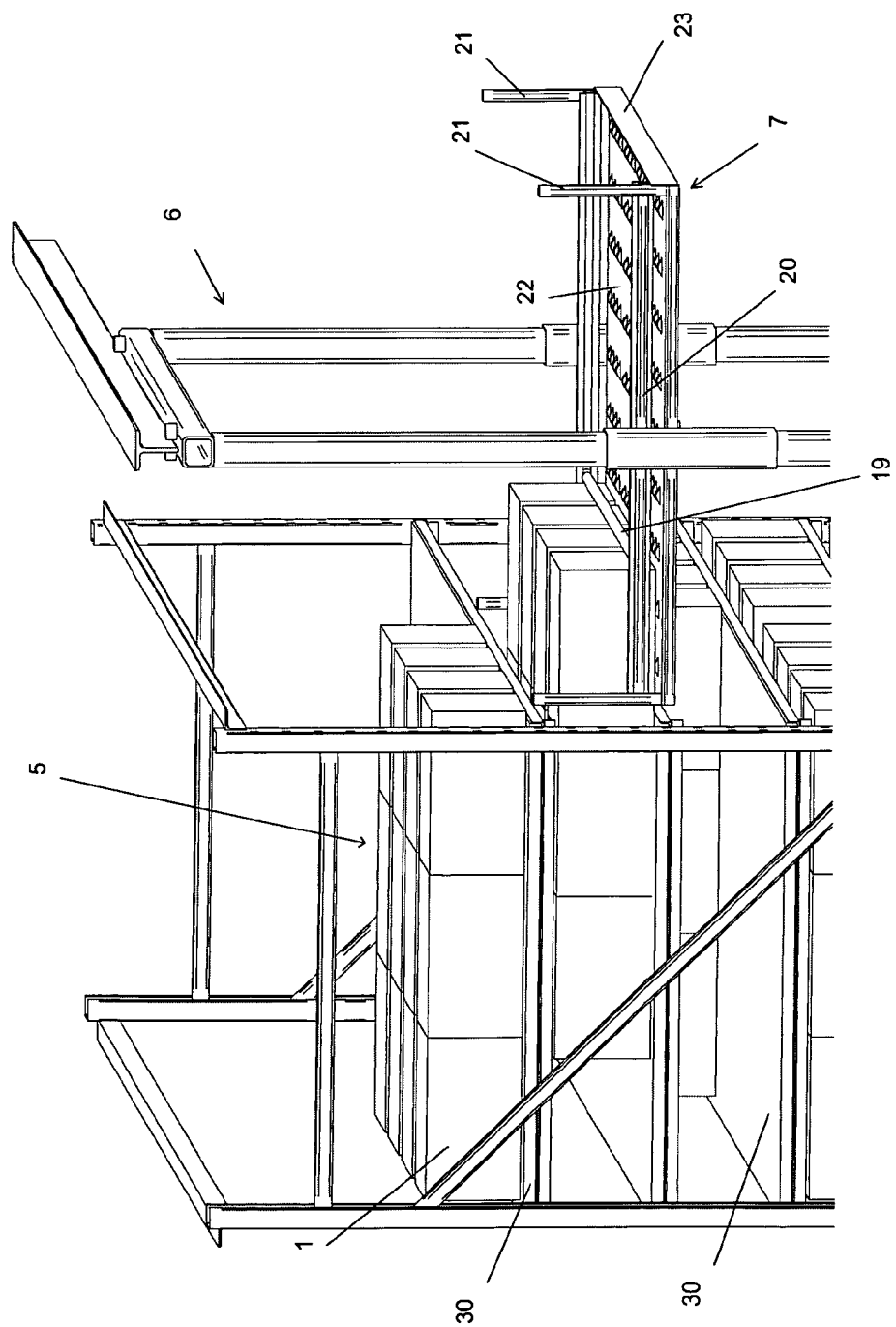
FIG. 7 is an enlarged perspective view the crane attachment of the second embodiment of the system in the process of loading a handling unit onto a storage shelf.

In FIG. 7, the crane attachment 7 of the system embodiment 200 is shown in the process of loading a handling unit 5 onto a storage shelf 30.

While the crane 6 is moving to its destination storage shelf 30 the case stop 23 of the crane attachment 7 is raised and the pusher/puller bar 19 is positioned behind the cases 1 of the handling unit 5 to be loaded onto the storage shelf 30.

Once the crane attachment 7 is in position in front of the empty storage shelf 30, the case stop 23 of the crane attachment 7 is lowered and then the pusher/puller bar 19 extends, pushing the handling unit 5 onto the storage shelf 30. The pusher/puller bar 19 then retracts horizontally to the crane attachment 7, allowing the crane 6 to move on.

Figure 8:
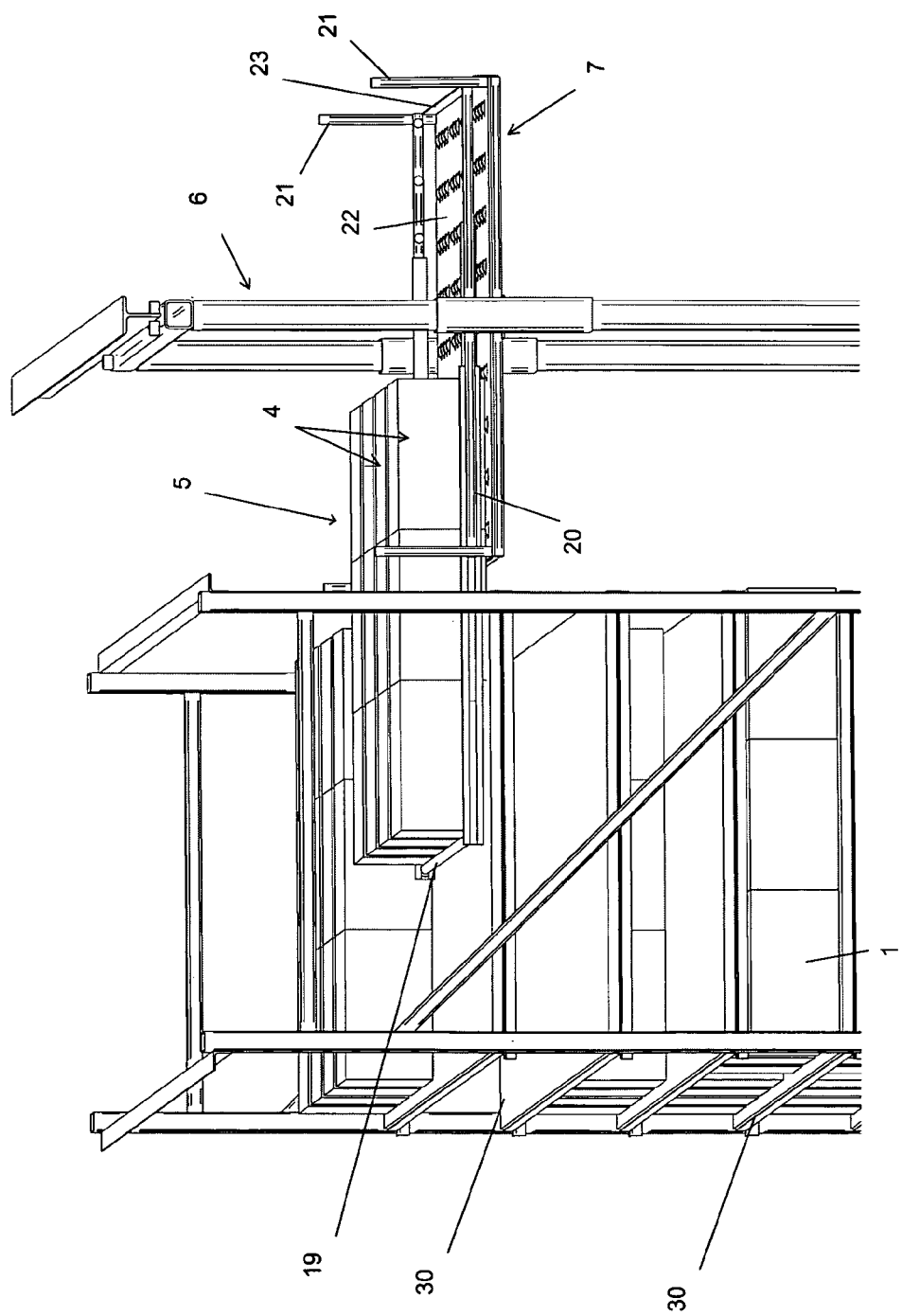
FIG. 8 is a perspective view of the crane attachment of the second embodiment of the system unloading a handling unit from a storage shelf.

In FIG. 8, the crane attachment 7 of the system embodiment 200 unloads a handling unit 5 from a storage shelf 30.

While the crane 6 is moving to its destination storage shelf 30 the case stop 23 of the crane attachment 7 is lowered and the pusher/puller bar 19 is raised to a vertical position above the height of the cases 1 of the handling unit 5 to be unloaded from the storage shelf 30.

Once the crane attachment 7 is in position in front of the empty storage shelf 30 the pusher/puller bar 19 extends horizontally over the top of the handling unit 5 on the storage shelf 30 and is then lowered behind the handling unit 5. The pusher/puller bar 19 then pulls the handling unit 5 from the storage shelf 30 onto the crane attachment 7.

Figure 9:
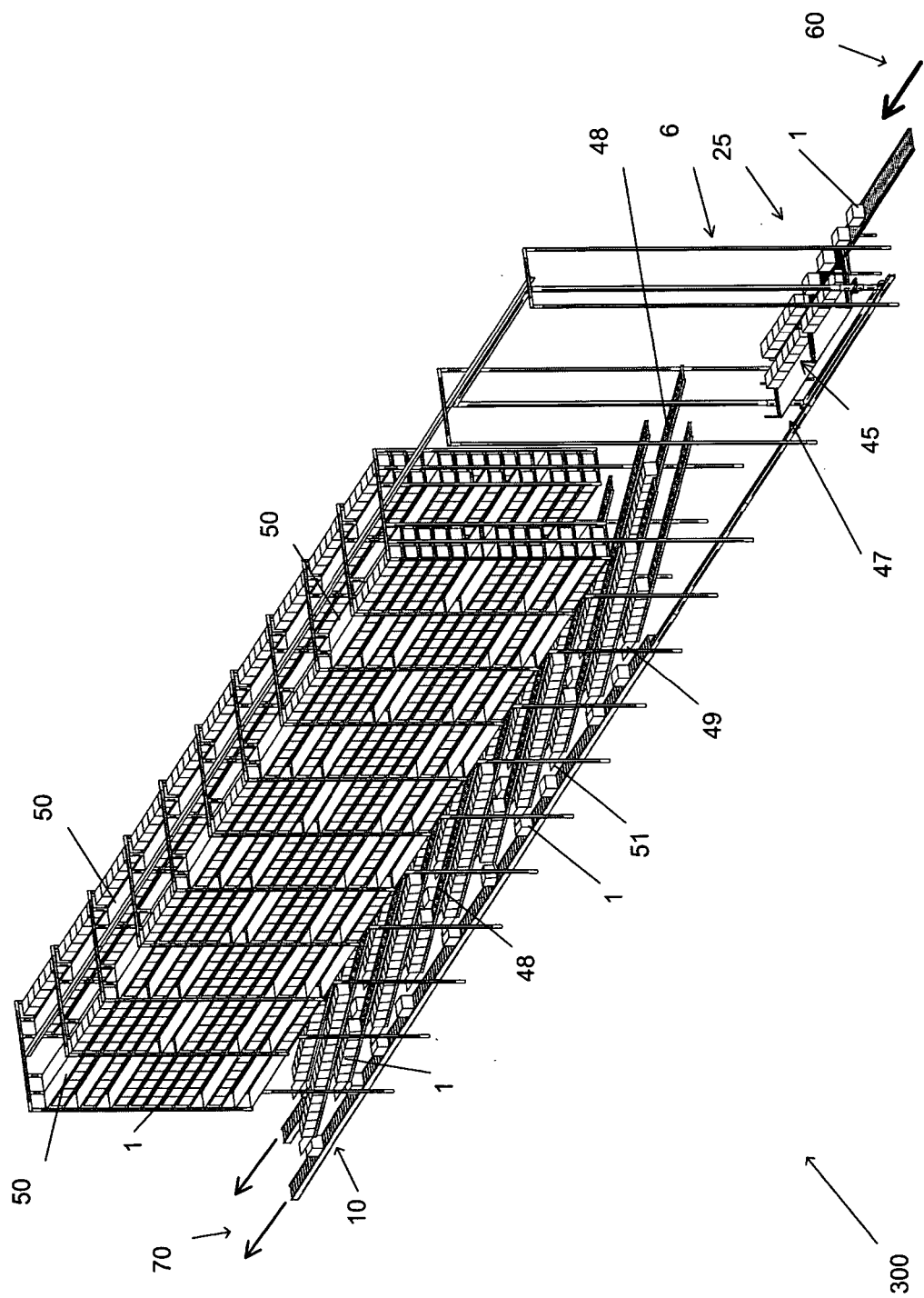
FIG. 9 is an overall perspective view of an automated case order preparation system for cases in accordance with a third embodiment of the present invention from the input of depalletized cases to the output of sequenced cases; showing the formation of a handling unit, the crane being loaded, the array of case guides and removal apparatuses, and the sequencing conveyors and storage shelves.
Figure 10:
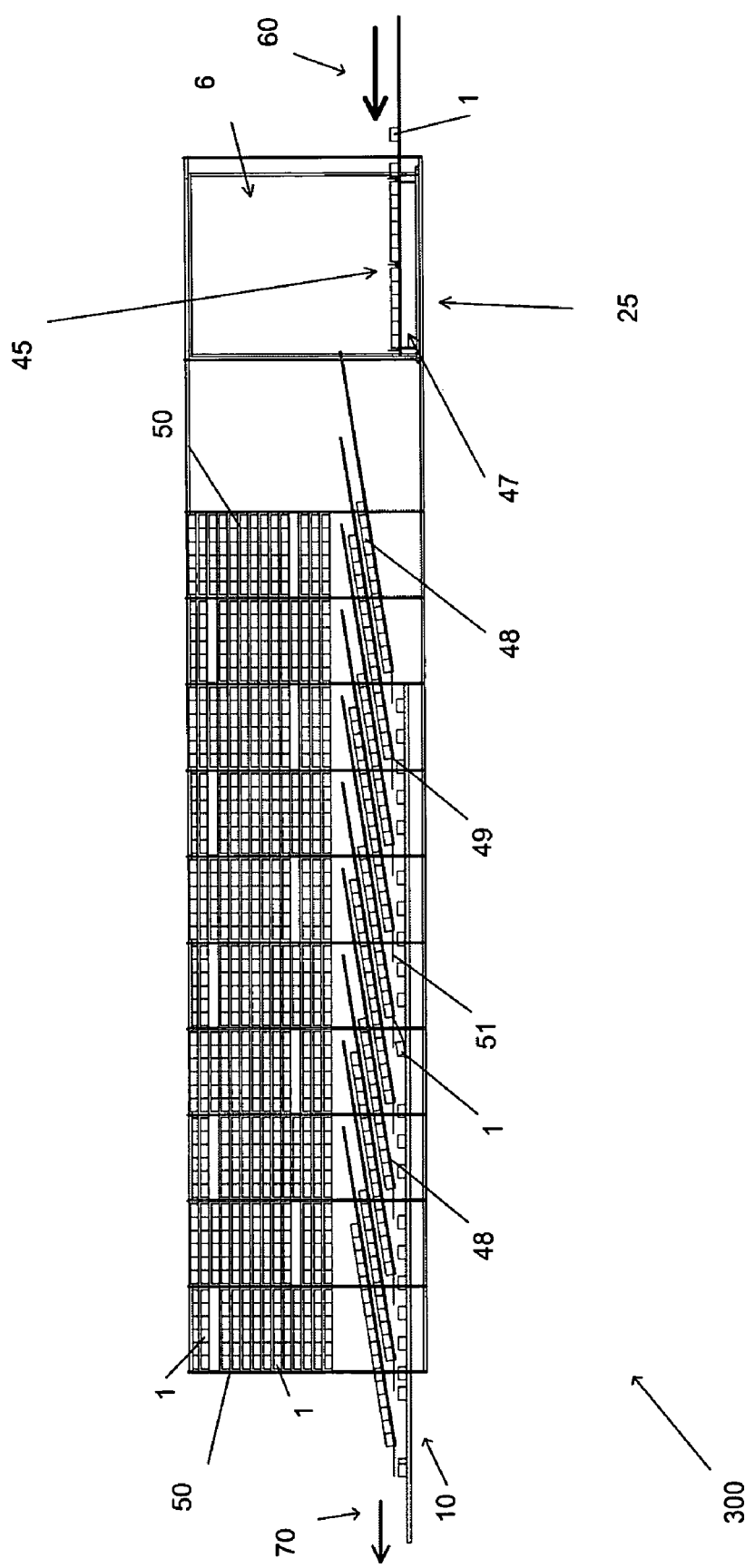
FIG. 10 is a side view of the third embodiment the system showing the array of case guides and shelves, the removal apparatuses, and the sequencing conveyors.
Figure 11:
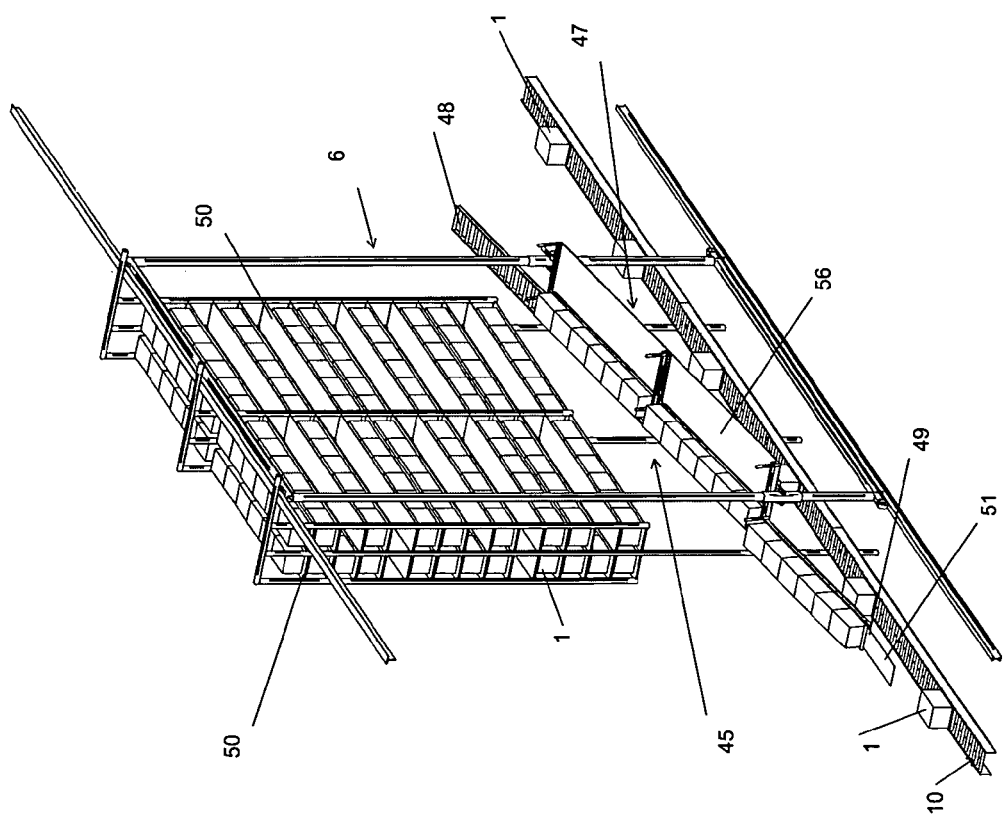
FIG. 11 is an enlarged sectional perspective view of the crane of the third embodiment of the system loading a handling unit into the case guides.

FIGS. 9 to 11 illustrate a third embodiment of the system.

More specifically, in FIG. 9, the third embodiment 300 of the system from the input of depalletized cases 1 to the output of sequenced cases 1 is shown with the formation of a handling unit 45, the crane 6 being loaded, the array of case guides 48 and case removal apparatuses 49, and the sequencing conveyors 10 and storage shelves 50.

In FIG. 10, the system embodiment 300 is shown with the array of case guides 48 and storage shelves 50, the removal apparatuses 49, and the sequencing conveyors 10.

In this system embodiment 300, the handling unit 45 is configured as a long single file of cases 1. The case guides 48 are long, designed to accept two handling units 45 are angled and offset in vertical arrangement above the sequencing conveyors 10 as described in U.S. Pat. No. 7,331,440 B2 granted to Lafontaine, and incorporated herein by reference. The case removal apparatuses 49 are comprised of lowerable chutes 51 which lower to allow cases 1 to transfer onto the sequencing conveyors 10.

One skilled in the art will recognize that the quantities of cases 1 per linear grouping and the quantity of cases per handling unit 45 as well as the quantity of cases carried by the crane 6 can change without deviating from the scope of the present invention.

In this system embodiment 300 storage shelves 50 are integrated to the system. The storage shelves 50 are located in a vertical arrangement above the case guides 48. Each storage shelf 50 can accommodate two complete handling units 45. The crane attachment 47 can carry two handling units. In this system embodiment 300, the storage shelves 50 are sufficient in number so that they can accommodate up to two product pallet quantities of storage space for each product type.

In an alternative embodiment that is not illustrated, the system described in system embodiment 300 can also be re-configured without handling unit 45 storage shelves 50 wherein the case guides 48 are replenished directly from the handling unit formation area similar to the system embodiment 100.

In FIG. 11, the crane 6 of the system embodiment 300 loads a handling unit 45 into the case guides 48.

The crane attachment 47 includes a plate 56 upon which rests the handling unit 45, is also able to tilt to match the angle of the case guides 48. The pusher/puller bars 19 push the handling unit 45 onto the case guide 48.

An optional extending case stop (not shown) attached to the crane attachment 47 can be extended over the case guide 48 at the downstream end of the handling unit 45 to guide and maintain the handling unit position during the transfer. This optional extending case stop is retracted quickly after the transfer is complete.

In alternative sub-system embodiments (not shown) to the system embodiments 100, 200 and 300 as described, the case guides 8 could be case flow conveyors, or skate wheel conveyors, or powered conveyors, the case removal apparatuses 9 could be powered, or the case removal apparatuses 9 could be powered and shuttle between the case removal apparatuses 9 as required, thereby servicing several case guides instead of being associated a particular case guide 8.

The crane attachment 47 illustrated in FIG. 11 could comprise a vertically powered horizontal platform upon which a tilting platform is mounted.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. An automated case order preparation system for cases, including means for providing the system with at least partial production pallets of cases of products, means for depalletizing cases from said pallets, means for palletizing a stream of sequenced said cases from an output sequencing conveyor to form a client pallet, and computerized means to control the operation of said system, the system comprising:
   means for forming handling units from depalletized said cases, said handling units comprising at least one linear grouping of said cases of one said products wherein a length of each linear grouping includes between two and a predetermined amount of individual said cases depending on the length and width of each said case of a corresponding said product;
   a crane transporting at least one handling unit from a handling-unit forming area to at least one receiving case guide;
   a crane attachment mounting on said crane to load and unload handling units from said forming means and to said case guide;
   at least one removal apparatus, each said removal apparatus connecting to one said case guide being designated to contain said cases of said corresponding said products;
   the sequencing conveyor at least temporarily connecting to a downstream end of each said removal apparatus, wherein an output of said conveyor being the stream of said cases in a predetermined sequence.

2. The system according to claim 1, wherein the cases within each said linear grouping touch one another.

3. The system according to claim 1, wherein the crane attachment transfers one said handling unit comprised of a plurality of said linear groupings, each said linear grouping being separated from one another by a space sufficient to ensure independent movement of each said linear grouping, from a direction parallel and in line with an upstream end of the case guides, into a plurality of parallel and adjacent said case guides.

4. The system according to claim 3, wherein the case guides are inclined with said guide downstream end and connection to the removal apparatus being lower than said guide upstream end and with an inclination angle allowing said cases located thereon to be transported and accumulated by gravity.

5. The system according to claim 4, wherein the case guides are free of speed controlling devices and wherein the crane, in conjunction with the crane attachment, release the handling unit on one said case guide in contact relationship with the cases already queued thereon.

6. The system according to claim 1, wherein the case guides are inclined with said guide downstream end and connection to the removal apparatus being lower than an upstream end of said guide and with an inclination angle allowing said cases located thereon to be transported and accumulated by gravity.

7. The system according to claim 6, wherein the case guides are free of speed controlling devices and wherein the crane, in conjunction with the crane attachment, release the handling unit on one said case guide in contact relationship with the cases already queued thereon.

8. The system according to claim 1, wherein shelving is provided for temporary storage of at least one said handling unit, said shelving being located on at least one side of an aisle of said crane.

9. The system according to claim 8, wherein the crane and the crane attachment transport at least one said handling unit from the handling unit forming area to the shelving, and at least one said handling unit from said shelving to at least one said case guide.

10. The system according to claim 9, wherein a plurality of both said case guides and said shelving are distributed along the length of said crane aisle.

11. The system according to claim 10, wherein said plurality of case guides is continuously distributed along the length of said case aisle.

12. The system according to claim 1, wherein the crane attachment discretely deposits one said handling unit comprised of at least one said linear grouping arranged in a single file, from a direction perpendicular to the length dimension of the case guide and wherein the crane attachment is parallel to the case guide in such a manner that all said cases within said one said handling unit are simultaneously transferred onto the case guide.

13. The system according to claim 12, wherein the case guides are inclined with said guide downstream end and connection to the removal apparatus being lower than an upstream end of said guide and with an inclination angle allowing said cases located thereon to be transported and accumulated by gravity, the crane attachment tilting to match said inclination angle of the case guides.

14. The system according to claim 13, wherein the case guides are free of speed controlling devices and wherein the crane, in conjunction with the crane attachment, release the handling unit on one said case guide in contact relationship with the cases already queued thereon.

15. An automated case order preparation method for cases, including the steps of providing at least partial production pallets of cases of products, depalletizing cases from said pallets, palletizing a stream of sequenced cases from an output sequencing conveyor to form a client pallet and directing the operation with a computerized control system, the method further comprising the following steps of:
   a) forming handling units from the depalletized cases, said handling units comprising at least one linear grouping of one of said products wherein a length of each said linear grouping includes between two and a predetermined amount of individual said cases depending on the length and width of each said case of said one of said products;
   b) loading at least one of said handling units onto an attachment mounted on a crane, transporting said at least one handling unit, using said crane, to at least one of a plurality of receiving case guides and unloading said at least one handling unit from said crane-mounted attachment onto at least one of said case guides;
   c) forming a stream of a predetermined sequence of cases on one said output sequencing conveyor wherein said conveyor is at least temporarily connected to at least one removal apparatus at least temporarily connected to one said case guide, wherein said one said case guide is designated to contain cases of one of said products and wherein said control system directs the operation of the removal apparatus.

16. The method according to claim 15, wherein the crane attachment transfers one said handling unit comprised of a plurality of said linear groupings, each said linear grouping separated from another by space sufficient to ensure, in step b) of the method, independent movement of each said grouping, from a direction parallel and in line with an upstream end of the case guides, into a plurality of parallel and adjacent said case guides.

17. The method according to claim 16, wherein the case guides are inclined with a downstream end of the case guide connected to the removal apparatus and is lower than said guide upstream end and with an inclination angle allowing said cases located thereon to be transported and accumulated by gravity in step b) of the method.

18. The method according to claim 17, wherein step b) of the method includes releasing the handling unit on said case guide in contact relationship with the cases already queued thereon using the crane in conjunction with the crane attachment.

19. The method according to claim 15, wherein the case guides are inclined with a downstream end of the case guide connected to the removal apparatus and is lower than an upstream end of the case guide and with an inclination angle allowing said cases located thereon to be transported and accumulated by gravity in step b) of the method.

20. The method according to claim 15, wherein shelving is provided for temporary storage of at least one said handling unit one behind another, said shelving being located on at least one side of an aisle of said crane, step b) of the method including loading, transporting, and unloading said handling units, using the crane and the crane attachment, from the handling unit forming area to the shelving, and from the shelving to at least one said case guide.

21. The method according to claim 15, wherein the crane attachment is parallel to the case guide in such a manner that step b) of the method includes discretely depositing one said handling unit comprised of at least one said linear grouping arranged in a single file from a direction perpendicular to the length dimension of the case guide and simultaneously transferring all said cases within the handling unit onto the case guide.

22. The method according to claim 21, wherein the case guides are inclined with a guide downstream end of said case guide connected to the removal apparatus being lower than an upstream end of said guide and with an inclination angle allowing said cases located thereon to be transported and accumulated by gravity, the crane attachment tilting to match said inclination angle of the case guides, and wherein step b) of the method includes releasing the handling unit on said case guide in contact relationship with the cases already queued thereon using the crane in conjunction with the crane attachment.

* * * * *